US005397494A

United States Patent [19]

Vega et al.

[11] Patent Number: 5,397,494

[45] Date of Patent: Mar. 14, 1995

[54] IMPROVING THE COLOR OF SURFACTANT AGGLOMERATES BY ADMIXING A SOLID BLEACHING AGENT

[75] Inventors: Jose L. Vega, Strombeek-Bever; Lucas Goovaerts, Haacht, both of Belgium

[73] Assignee: The Procter & Gamble Company, Cincinnati, Ohio

[21] Appl. No.: 39,332

[22] PCT Filed: Oct. 21, 1991

[86] PCT No.: PCT/US91/07758

§ 371 Date: Apr. 27, 1993

§ 102(e) Date: Apr. 27, 1993

[87] PCT Pub. No.: WO92/07926

PCT Pub. Date: May 14, 1992

[30] Foreign Application Priority Data

Oct. 30, 1990 [NL] Netherlands .................... 90202886.9

[51] Int. Cl.$^{6}$ ........................ C11D 1/28; C11D 11/04; B29C 67/02

[52] U.S. Cl. ...................................... 252/95; 252/549; 252/554; 554/97; 564/117

[58] Field of Search ......................... 252/95, 549, 594; 264/117; 554/97

[56] References Cited

U.S. PATENT DOCUMENTS

| | | | |
|---|---|---|---|
| 3,142,691 | 7/1964 | Wulff et al. | 260/400 |
| 3,452,064 | 6/1969 | Stein et al. | 260/400 |
| 3,485,856 | 12/1969 | Wulff et al. | 260/400 |
| 4,059,538 | 11/1977 | Green et al. | 252/95 |
| 4,097,418 | 6/1978 | Rolfes | 252/531 |
| 4,547,318 | 10/1985 | Kloetzer et al. | 260/400 |
| 4,874,552 | 10/1989 | Richtler et al. | 260/400 |
| 5,080,848 | 1/1992 | Strauss et al. | 264/117 |

FOREIGN PATENT DOCUMENTS

| | | |
|---|---|---|
| 746523 | 11/1966 | Canada . |
| 8416870 | 7/1982 | Japan . |

*Primary Examiner*—Richard L. Raymond
*Attorney, Agent, or Firm*—Ken K. Patel; Jacobus C. Rasser; Jerry J. Yetter

[57] ABSTRACT

The present invention relates to a process for manufacturing improved color surfactant agglomerates, particularly comprising methyl ester sulfonates, for use in detergent compositions, said process comprising sulfonation of methyl ester, digestion of the sulfonation product, esterification of said sulfonated product to produce an acid product and agglomeration of said acid product, characterized in that said acid product is exposed to a solid bleaching agent immediately prior to or during agglomeration of said acid product.

11 Claims, No Drawings

IMPROVING THE COLOR OF SURFACTANT AGGLOMERATES BY ADMIXING A SOLID BLEACHING AGENT

TECHNICAL FIELD

The invention relates to a process for producing surfactant agglomerates with improved color by admixing a solid bleaching agent,

BACKGROUND OF THE INVENTION

The present invention involves a novel process for producing surfactant agglomerates with improved color for use in detergent compositions by admixing a solid bleaching agent. In particular, the surfactant agglomerate produced by the process of the present invention comprises methyl ester sulfonates (MES) as one of the components. The production of alkali metal salts of α-sulfofatty acid alkyl esters ("ester sulfonates") by sulfonation of fatty acid methyl esters with gaseous $SO_3$ and subsequent neutralization of the sulfonic acids formed with aqueous alkali metal hydroxides, for example with sodium hydroxide, has been known for some time. The end products of this process, i.e. the alkali metal salts of the corresponding α-sulfofatty acid alkyl esters, are predominantly used as detergents in washing and cleaning preparations.

However, all hitherto known production processes have remained unsatisfactory either because, although light colored end products suitable for direct use in the detergent industry can be obtained, the yields of the sulfonation step leading to those products are highly unsatisfactory, or because although high sulfonation yields can be obtained, the color instability of the fatty acids or fatty acid esters in the sulfonation step means that dark-colored to brown-black crude products unsuitable for direct use in washing and cleaning preparations are regularly obtained. Accordingly, a sulfonation step taken to high yields normally has to be followed by bleaching of the dark α-sulfofatty acid derivatives formed in the sulfonation step to obtain light-colored products suitable for use in washing and cleaning systems. Methyl ester sulfonates in particular have been used in many detergent compositions as "natural" surfactants—i.e. surfactants derived from such sources as tallow, coconut and palm. These products, in particular, have been made only while encountering numerous problems, including the major problem that when combining MES with inorganic powders to make MES agglomerates, such MES agglomerates are generally dark to black in color, and therefore contain qualities unsuitable to the consumer for a detergent product.

Another difficulty of hitherto known processes for the production of aqueous ester sulfonates is that, in the course of the production process, the products accumulate in the form of water-containing pastes having high active-substance content. In particular, past attempts to come up with an acceptably colored detergent product comprising MES yielded high viscosity pastes using other systems. However, pastes such as these can no longer be pumped on their own; the high viscosity behavior of ester sulfonate pastes such as these always involves the risk of blockages in apparatus and pipes. Accordingly, there has long been a need to find production processes for such alkali metal salts of a-sulfofatty acid alkyl esters in which the high viscosity of the products obtained is avoided, or lessened in the process.

A third problem often encountered with ester sulfonates and particularly MES comprising detergents, is that addition of hypochlorite or hydrogen peroxide to the acid mixture to solve the color problem (in addition to causing a highly viscous paste) have also tended to cause hydrolysis at the ester in alkaline solution and formation of a disalt too hydrophilic for general dirt/-grease detergency use.

Japanese published patent application no. 84-16870 describes a process for the production of alpha-sulfofatty acid ester salts, in which alpha-sulfofatty acid esters formed during the sulfonation step are bleached with $H_2O_2$ in the presence of a polycarboxylic acid or one of its salts and subsequently converted by neutralization into the corresponding alpha-sulfofatty acid esters salt. Although the salts formed are very suitable for use as detergents in washing and cleaning preparations, the reaction time required for the bleaching step is of the order of 1 hour which does not include the time required for the following neutralization reaction.

U.S. Pat. No. 4,547,318 describes a process for the production of color-stable, light-colored aqueous salt pastes of washing-active alpha-sulfofatty acid esters in which the dark-colored alpha-sulfofatty acid esters emanating from the sulfonation step are first prebleached with alkali metal hypochlorites in neutral to mildly alkaline aqueous solution and are then fully bleached with hydrogen peroxide in the usual way in a mildly acidic aqueous solution. The bleaching process as a whole takes several hours, involves a change in the pH value of the reaction medium with all the ensuing disadvantages, and gives aqueous salt pastes of which the active substance content is in the range of from 20 to 60% by weight which, as described above, gives rise to problems affecting the process due to the considerable increase in viscosity with increasing active substance content.

U.S. Pat. No. 3,142,691 describes the production of light-colored sulfonated fatty acids and fatty acid derivatives, more particularly through a process for bleaching dark-colored sulfonated fatty acids and sulfonated fatty acid derivatives by treatment with oxyacids having a strong oxidizing effect, or salts or anhydrides of these oxyacids.

U.S. Pat. No. 4,874,552 describes the production of solid, substantially anhydrous alkali metal salts of alpha-sulfofatty acid alkyl esters by simultaneously mixing the esters with an aqueous solution of hydrogen peroxide or an $H_2O_2$-yielding compound with a solid alkali metal carbonate at particular temperature ranges, optionally in the presence of aqueous alkali metal hydroxide.

The present invention seeks to provide a process for improving the color of surfactant agglomerates, particularly MES comprising agglomerates. It further seeks to provide a process which avoids the prior art two-step process of bleaching and agglomeration separately, with no visible detriment to agglomerate color with time. The present invention further describes a process which avoids the addition of water or aqueous bleaching agents or solutions comprising other bleaching agents, thus reducing the problems associated with high viscous pastes and/or foaming acid product which is often associated with the high quantity of water in the processes of the prior art. In accomplishing this, the present invention seeks to provide the advantage of a process for producing highly active particle agglomerates with decreased water content, which thereby reduces the need for drying of the agglomerates.

SUMMARY OF THE INVENTION

The present invention relates to a process for producing improved color surfactant agglomerates comprising ester sulfonates, especially methyl ester sulfonates (MES). In currently practiced processes, many surfactant agglomerates, such as those comprising MES, retain undesirable color properties, rendering the surfactants unsuitable for use in the most widely used detergent products. For this reason, most detergents comprising MES have bleached MES granules after esterification with an aqueous bleaching agents prior to its neutralization.

It has now surprisingly been found that solid α-sulfofatty acid alkyl ester salts substantially free from water, and particularly MES comprising agglomerates, having outstanding color values and high color stability can be obtained by carrying out bleaching with solid bleaching agents, and preferably, neutralization (especially dry neutralization) of the dark-colored α-sulfofatty acid alkyl esters such as MES, resulting from the sulfonation step.

In the process of the present invention, by avoiding early bleaching or neutralization of the product before agglomeration of the granules, the high viscous paste product is avoided, and thus the present invention also provides the unexpected benefit of ease in formation of the color-acceptable product. The present invention also reduces the problem of an overly hydrated paste which increases the tendency to disalt formation.

By avoiding the addition of hypochlorite or hydrogen peroxide to the acid mixture, and the subsequent step of hydrolysis at the ester in alkaline solution and formation of a disalt, the present invention unexpectedly reduces the problem of an overly hydrated paste. In the process of the invention, a preferred embodiment allows that any alkali metal carbonates can be used either individually or in admixture as the alkali metal carbonate both in the presence and in the absence of the aqueous alkali metal hydroxide solution. However, sodium carbonate is preferably used for the process of the invention by virtue of its inexpensive availability.

In addition, the products formed have a high solids or active-substance content and are much easier to further process and use as detergents in washing and cleaning preparations than state-of-the-art products. Alkali metal salts of α-sulfofatty acid esters prepared from crude α-sulfofatty acid esters by neutralization and, optionally, bleaching always contain a certain proportion of dialkali metal salts of the free α-sulfofatty acids. These disalts emanate partly from the alkaline hydrolysis of the mixed anhydrides of α-sulfofatty acid esters and methyl sulfuric acid proportionately present in the crude sulfonation product. Another proportion of disalt emanates from the unwanted alkaline hydrolysis of the α-sulfofatty acid methyl ester at elevated temperature and at pH values of 9 and higher. Therefore, extreme care must be exercised during the execution of these steps to avoid disalt formation.

It has surprisingly been found that the alkali metal salts of α-sulfofatty acid esters (MES agglomerates) prepared by the process of the present invention avoid substantial disalt problems, without any special consideration.

DETAILED DESCRIPTION OF THE INVENTION

The present invention relates to a process for manufacturing improved color surfactant agglomerates, particularly comprising methyl ester sulfonates, for use in detergent compositions, said process comprising sulfonation of methyl ester, digestion of the sulfonation product, esterification of said sulfonated product to produce an acid product and agglomeration of said acid product, characterized in that said acid product is exposed to a solid bleaching agent immediately prior to or during agglomeration of said acid product. The agglomerates thus formed and ultimately used in detergent compositions are generally of adequate particle size for detergent, and especially powder detergent compositions (preferably from about 100 um to 1400 um in diameter), and exhibit good free flowing characteristics.

In such a process, it is preferred that said acid product is neutralized simultaneous with or subsequent to its exposure to the solid bleaching agent; it is even more preferred that said in said process said acid product is neutralized subsequent to its exposure to the solid bleaching agent. It is further preferred that subsequent, concurrent with, or preferably before the formation of the MES comprising agglomerates, the acid product is neutralized by dry neutralization.

The terms used herein are those generally known to the man skilled in the art. Some of the initial steps of the process of the present invention are also known to the man skilled in the art. An example of digestion is an α-sulphofatty acid sulphoester process by which the mixture of products leaving the falling film sulphonator adjust to the maximization of the α-sulphofatty acid ester. This can be done in a holding tank at a given temperature with a residence time large enough so that the kinetically preferred α-sulphofatty acid sulphoester slowly rearranges to the thermodynamically preferred α-sulphofatty acid ester. Another step known to the man skilled in the art is esterification, an example being a process by which the acid mixture after digestion is contacted with methanol for a given residence time at a certain temperature in order to maximize the formation of the α-sulphofatty acid ester and reduce the level of disalt formation. Other steps, such as addition of perfumes, coating agents, solubilizing agents, etc., can also be found in common agglomeration processes. In describing characteristics of detergent agglomerates a man of skill in the art recognizes that good free flowing characteristics include such qualities as low caking tendency, low stickiness, low angle of repose, and the like. Percentages herein are generally by weight, unless otherwise indicated.

Any of a number of solid bleaching agents may be utilized in the process of the present invention. Solid bleaching agents include sodium perborates in any hydration form (monohydrate, tetrahydrate, etc.), sodium percarbonate, etc. Non limiting-examples of such solid bleaching agents include sodium perborates (monohydrate, tetrahydrate, etc.), sodium percarbonate, urea peroxide, phosphate peroxyhydrates (such as sodium pyrophosphate peroxyhydrate), calcium hypochlorite, lithium hypochlorite, chlorinated trisodium phosphate, sodium chlorite, potassium permonosulphate, sodium or potassium bisulphites, sodium or zinc dithionites, and sodium borohydride. Preferred solid bleaching agents for use in the present invention include solid bleaching agents selected from the group consisting of perborates, percarbonates, and organic peroxygens (peracid); more preferred being sodium or potassium percarbonate. It is also preferred that the solid bleaching agent of the present invention be in a finely divided, powder-type form. It is more preferred that the solid bleaching agent have an average particle size of less than 800 μm, even more preferred less than 200 μm.

The solid bleaching agents of the present invention may be used at various levels and in quantities presently used to bleach detergent granules and in conventional ratios to the acid product before bleaching. Preferably, the solid bleaching agent is used at a level related to the acid product wherein the ratio of said solid bleaching agent is between 1% to 200% of said acid product, preferably between 10% to 100% of said acid product. It has also been found that the acid product, at the time of exposure to the solid bleaching agent, is preferably at a temperature of between 60° C.–90° C.

In a preferred embodiment, the process of the present invention comprises the steps of:

1) Contacting the acid MES with the desired amount of the solid bleaching agent in a finely divided powder form to form a mix;
2) contacting the above mix immediately with a dry neutralizing agent (or alternatively, a dry neutralizing agent, and other desirable powders), in a suitable mixer/agglomerator;
3) manufacturing MES agglomerates with good free flowing characteristics in the agglomerating equipment;

where suitable (improved color) finished agglomerates comprising MES are obtained.

Steps 1 and 2 could alternative be done simultaneously, thus allowing contact between the acid MES with the bed of premixed powders in the mixer/agglomerator. In this manner, adequate product is formed, but there may be a slight decrease in color improvement over the above described method.

The agglomerates made by the process of the present invention may initially appear of less than desired or adequate color, but upon storage the color continuously improves.

Accordingly, the present invention relates to a process for the production of methylalkali metal salts of ester sulfonate comprising agglomerates, and particularly MES comprising agglomerates, by bleaching and, preferably neutralization of methyl ester sulfates in an apparatus suitable for the processing of products. The MES is mixed at 20° C. to 120° C., preferably 60° C. to 120° C., more particularly at 60° C. to 90° C., simultaneously with a solid bleaching agent or an $H_2O_2$-yielding compound and with solid alkali metal carbonate, optionally in the presence of the ratio by weight of ester to solid bleaching agent being from 0.5 to 25; preferably from about 1.5 to 5. The product formed is a particle (agglomerate) of adequate characteristics to be dry added to granular detergents and the solids formed are blended by known methods.

Any apparatus, planta or units suitable for the processing of MES can be used for carrying out the process according to the invention. Suitable apparatus includes, for example, falling film sulphonating reactors, digestion tanks, esterification rectors, etc. For mixing/agglomeration any of a number of mixers/agglomerators can be used. In one preferred embodiment, the process of the invention is continuously carried out. Especially preferred are mixers of the Fukae® FS-G series manufactured by Fukae Powtech Kogyo Co., Japan; this apparatus is essentially in the form of a bowl-shaped vessel accessible via a top port, provided near its base with a stirrer having a substantially vertical axis, and a cutter positioned on a side wall. The stirrer and cutter may be operated independently of one another and at separately variable speeds. The vessel can be fitted with a cooling jacket or, if necessary, a cryogenic unit.

Other similar mixers found to be suitable for use in the process of the invention include Diosna® V series ex Dierks & Söhne, Germany; and the Pharma Matrix® ex T K Fielder Ltd., England. Other mixers believed to be suitable for use in the process of the invention are the Fuji® VG-C series ex Fuji Sangyo Co., Japan; and the Roto® ex Zanchetta & Co srl, Italy.

Other preferred suitable equipment can include Eirich®, series RV, manufactured by Gustau Eirich Hardheim, Germany; Lödige®, series FM for batch mixing, series Baud KM for continuous mixing/agglomeration, manufactured by Lödige Machinenbau GmbH, Paderborn Germany; Drais® T160 series, manufactured by Drais Werke GmbH, Mannheim Germany; and Winkworth® RT 25 series, manufactured by Winkworth Machinery Ltd., Bershire, England.

The α-sulfofatty acid alkyl esters used as starting materials for the process emanate from the processes typically used in the prior art for the sulfonation of fatty acid alkyl esters. Esters such as these are obtained from synthetic, semi-synthetic or natural oils and/or fats which may in turn originate from plants, land animals or aquatic animals. Their fatty acid residues contain from 8 to 22 carbon atoms and preferably from 12 to 18 carbon atoms. More preferred fatty acid residues of the present invention contain from 16 to 18 carbon atoms. The ester group of the fatty acid alkyl esters normally contains from 1 to 6 and preferably from 1 to 3 carbon atoms, the corresponding methyl esters being particularly preferred.

These esters are generally formed by saponification of synthetic, semi-synthetic or natural oils and/or fats and mixtures thereof and reaction of the fatty acids formed with monohydric alcohols containing from 1 to 6 carbon atoms or by direct transesterification with the corresponding alcohols, particularly methanol. The corresponding fatty acid esters are then sulfonated in known manner at elevated temperature with a mixture of gaseous sulfur trioxide and inert gas in a sulfonation reactor, resulting in the formation of products having a degree of sulfonation of more than 90%, which are more or less dark in color due to the color instability of the fatty acid alkyl esters.

In an embodiment of the process of the invention, neutral to mildly alkaline α-sulfofatty acid alkyl ester salts ("ester sulfonates") having a water content of less than 10% and Klett color values below 100 can be prepared by simultaneous oxidative bleaching and neutralization. The starting materials used are the crude products of the sulfonation of fatty acid alkyl esters containing from 8 to 22 carbon atoms and preferably from 12 to 18 carbon atoms in the fatty acid chain, i.e., α-sulfofatty acid alkyl esters.

Bleaching is carried out with solid bleaching agents as disclosed herein or a combination of solid bleaching agents. The neutralization may be carried out with alkali metal carbonates, particularly sodium carbonate or sodium bicarbonate or other alkaline solids such as sodium citrate, sodium silicate, etc. In the course of a preferred embodiment of the present invention, a preferably simultaneous bleaching and dry neutralization reaction occurs, the bleaching effect of the solid bleaching agent being surprisingly enhanced or not substantially affected by the dual reactions, without the problems to a significant extent which often occur with two-step bleaching and neutralization treatments known from the prior art. There is thus no need for a second alkaline bleaching treatment. Neutral to mildly alkaline solids which may be pelletized, granulated or flaked by methods known per se are obtained as the products of the simultaneous bleaching and neutralization reaction upon cooling of the reaction mixture to room temperature the products are not tacky and are readily soluble in water.

The more or less dark-colored α-sulfofatty acid alkyl esters obtained from the sulfonation of fatty acid alkyl esters are used in substantially (anhydrous) form in the process of the invention. The starting materials may be solid or molten, depending on the α-sulfofatty acid alkyl esters used as raw material and the particular reaction temperature selected. The reaction temperature is normally in the range of from 20° C. to 120° C., preferably from 20° C. to 90° C., most preferably in a temperature range of from 60° C. to 90° C., being particularly preferred for carrying out the bleaching and, preferably, neutralization process according to the invention. At high temperatures, for example at temperatures of from 60° C. to 90° C., the α-sulfofatty acid alkyl esters used are preferably present in molten form.

Solid bleaching agent and a solid alkali metal carbonate or bicarbonate are simultaneously added in the temperature range indicated to the α-sulfofatty acid alkyl esters used as starting materials, of which—as described above—the methyl esters are particularly preferred by virtue of their ready accessibility from native sources, such as tallow, coconut oil or palm kernel oil, after reaction with methanol. Solid bleaching agents having application in typical detergent formulations such as sodium perborates and percarbonates are preferably used in practice. The safety precautions required for the handling of concentrated hydrogen peroxide solutions are known to the man of skill in the art and have to be taken here.

The agglomeration process itself is well known in the art. Numerous standardly used powders can be of use in agglomerate formation, including, for example, carborates, zeolites, silican, and the like.

In some processes where α-sulfofatty acid alkyl esters or ester mixtures are obtained directly from the sulfonation of native fatty acid alkyl esters, the esters are mixed as such with the bleach and possibly a neutralizing agent, in a suitable mixer/agglomerator. The reaction begins spontaneously. The beginning of the reaction is reflected in the foaming (under the effect of carbon dioxide released) and gradual lightening of the mixture. In the present invention, the problem of foaming is avoided, thus simplifying the obtainment of acceptable agglomerates.

METHODS OF USING THE PROCESS OF THE INVENTION

Composition Examples

The following examples illustrate some of the possible embodiments of the present invention, but are not intended to limit the scope of the application.

In the following composition examples, the agglomerates contain the following particulate composition.

| Ingredients | Percent by weight |
|---|---|
| Composition 1 | |
| Methyl ester sulphuric acid (acid MES) | 25.0% |
| Zeolite A | 40.0% |
| Sodium carbonate | 25.0% |
| Bleaching agent (perborate monohydrate) | 10.0.% |
| Composition 2 | |
| Methyl ester sulphuric acid | 25.0% |
| Zeolite A | 40.0% |
| Bleaching agent (perborate monohydrate) | 10.0% |
| Other ingredients | Balance to 100% |
| Composition 3 | |
| Methyl ester sulphuric acid | 25.0% |
| Zeolite A | 30.0% |
| Bleaching agent (perforate monohydrate) | 20.0% |
| Other ingredients | Balance to 100% |
| Composition 4 | |
| Methyl ester sulphuric acid | 25.0% |
| Zeolite A | 0.0% |
| Sodium carbonate | 25.0% |
| Bleaching agent (perborate monohydrate) | 50.0% |
| Composition 5 | |
| Methyl ester sulphuric acid | 25.0% |
| Zeolite A | 45.0% |
| Sodium carbonate | 25.0% |
| Bleaching agent (perborate monohydrate) | 5.0% |
| Composition 6 | |
| Methyl ester sulphuric acid | 25.0% |
| Zeolite A | 45.0% |
| Bleaching agent (perborate monohydrate) | 5.0% |
| Other ingredients | Balance to 100% |

PROCESS EXAMPLES

EXAMPLE I

Acid MES (methyl ester sulphuric acid) is heated up in a conventional oven until it reaches 60° C. At the same time, a mixture of powders is prepared containing the solid bleaching agent (parborate monohydrate), the dry neutralizing agent (sodium carbonate) and some flowing acids (Zeolite A). The mixture of these powders is placed inside an Eirich mixer model RV02 (from Maschinenfabrik Gustav Eirich) and the equipment is started. The acid MES is then slowly poured on the powder bed until acceptable agglomerates are formed.

EXAMPLE 2

The methyl ester sulphuric acid is again heated up to about 60° C. in a suitable vessel (for example in a thermostated bath). The desired amount of the solid bleaching agent is then added to the acid and the mix is stirred until good dispersion is observed. This mix is then poured into the Eirich mixer model RV02 where a mixture of the rest of the powder ingredients (dry neutralizing agent, flowing aids, etc.) has been placed. The mixer is then operated until acceptable agglomerates are formed.

We claim:

1. A process for making improved color surfactant agglomerates comprising methyl ester sulfonate for use in detergent compositions, said process comprising the steps of sulfonation of methyl ester, digestion of the sulfonation product, esterification of said sulfonated product to produce an acid product and agglomeration of said acid product, wherein said acid product is exposed to a solid bleaching agent during agglomeration.

2. The process according to claim 1 wherein said solid bleaching agent is in a finely divided powder form.

3. A process according to claim 1 wherein said acid product is neutralized simultaneous with or subsequent to its exposure to the solid bleaching agent.

4. A process according to claim 3 wherein said acid product is neutralized subsequent to its exposure to the solid bleaching agent.

5. A process according to claim 1 wherein said solid bleaching agent is selected from the group consisting of perborate, percarbonate, and organic peroxygens.

6. A process according to claim 3, 4 or 5 wherein said acid product is neutralized by dry neutralization.

7. A process according to any one of claims 1, 3, 4, or 5 wherein the ratio of said solid bleaching agent is from 1% to 200% of said acid product.

8. A process according to claim 7 wherein the ratio of said solid bleaching agent is from 10% to 100% of said acid product.

9. A process according to any one of claims 1, 3, 4 or 5 wherein said acid product is at a temperature of between 60° C.–90° C. at the time of its exposure to the solid bleaching agent.

10. A process according to claim 1 wherein said solid bleaching agent is selected from the group consisting of sodium percarbonate and potassium percarbonate.

11. In a process for making improved color surfactant agglomerates containing methyl ester sulfonate surfactant for use in detergent compositions, which process comprises the steps of:

(i) sulfonating a methyl ester to produce a sulfonation product;

(ii) digesting the sulfonation product, (iii) esterifying the digested sulfonation product to produce an acid product, and (iv) agglomerating said acid product, the improvement which comprises contacting said acid product at a temperature of between about 60° C. and 90° C. with a solid percarbonate or perborate bleaching agent while simultaneously or shortly thereafter dry neutralizing said acid product.

* * * * *